US00RE43666E

(19) United States
(12) Reissued Patent
Stephen

(10) Patent Number: US RE43,666 E
(45) Date of Reissued Patent: Sep. 18, 2012

(54) SENSOR APPARATUS AND METHOD

(75) Inventor: Gordon Stephen, Edinburgh (GB)

(73) Assignee: Concept Systems Limited, Edinurgh (GB)

(21) Appl. No.: 10/914,023

(22) Filed: Aug. 6, 2004

Related U.S. Patent Documents

Reissue of:
(64) Patent No.: 6,430,105
Issued: Aug. 6, 2002
Appl. No.: 09/326,023
Filed: Jun. 4, 1999

(30) Foreign Application Priority Data

Jun. 5, 1998 (GB) ..... 9812006

(51) Int. Cl.
*G01V 1/38* (2006.01)

(52) U.S. Cl. ..... 367/15; 367/20

(58) Field of Classification Search ..... 367/37, 367/15, 20, 19, 17, 21, 214, 16, 38; 73/1.75, 73/1.85
See application file for complete search history.

(56) References Cited

U.S. PATENT DOCUMENTS

| | | | | | |
|---|---|---|---|---|---|
| 3,877,313 | A | | 4/1975 | Ferriss | 73/516 R |
| 4,300,220 | A | * | 11/1981 | Goff et al. | 367/188 |
| 4,477,887 | A | * | 10/1984 | Berni | 367/20 |
| 4,841,772 | A | * | 6/1989 | Paik | 73/382 G |
| 4,870,580 | A | * | 9/1989 | Lang et al. | 367/47 |
| 4,893,290 | A | * | 1/1990 | McNeel et al. | 367/178 |
| 4,912,471 | A | | 3/1990 | Tyburski et al. | 342/42 |
| 4,932,261 | A | | 6/1990 | Henrion | 73/517 B |
| 5,060,504 | A | | 10/1991 | White et al. | 73/1 D |
| 5,126,980 | A | * | 6/1992 | Sallas et al. | 367/178 |
| 5,160,925 | A | | 11/1992 | Dailey et al. | 340/853.3 |
| 5,300,929 | A | | 4/1994 | MacLeod | 340/853.8 |
| 5,433,101 | A | | 7/1995 | Spangler et al. | 73/1 D |
| 5,524,100 | A | * | 6/1996 | Paffenholz | 367/24 |
| 5,724,307 | A | * | 3/1998 | Gaiser | 367/21 |
| 5,747,754 | A | * | 5/1998 | Svenning et al. | 181/401 |
| 5,842,149 | A | | 11/1998 | Harrell et al. | 702/9 |
| 5,866,827 | A | * | 2/1999 | Stewart et al. | 73/784 |
| 5,963,508 | A | * | 10/1999 | Withers | 367/38 |
| 6,005,828 | A | * | 12/1999 | Carroll et al. | 367/19 |
| 6,021,090 | A | * | 2/2000 | Gaiser et al. | 367/15 |
| 6,075,754 | A | | 6/2000 | VanZandt et al. | 367/182 |
| 6,101,864 | A | | 8/2000 | Abrams et al. | 73/1.01 |
| 6,255,962 | B1 | | 7/2001 | Tanenhaus et al. | 340/870.05 |
| 6,483,776 | B1 | * | 11/2002 | Rokkan | 367/20 |

FOREIGN PATENT DOCUMENTS

| | | | |
|---|---|---|---|
| EP | 08285952 | | 1/1996 |
| GB | 2 086 055 | A | 5/1982 |
| GB | 2 209 833 | A | 5/1989 |
| GB | 2 251 078 | A | 6/1992 |
| GB | 2 314 163 | A | 12/1997 |
| WO | WO98/12577 | | 3/1998 |
| WO | WO98/14800 | | 4/1998 |

* cited by examiner

*Primary Examiner* — Mark Hellner
(74) *Attorney, Agent, or Firm* — Mossman, Kumar & Tyler, PC

(57) ABSTRACT

A multi component seismic sensor which utilises orthogonal accelerometers to determine its orientation. The accelerometers may be used to measure seismic signals directly, or the system may include geophones for this purpose.

5 Claims, 5 Drawing Sheets

SENSOR APPARATUS AND METHOD

Matter enclosed in heavy brackets [ ] appears in the original patent but forms no part of this reissue specification; matter printed in italics indicates the additions made by reissue.

BACKGROUND OF THE INVENTION

This invention relates to a sensor apparatus and method and in particular to a sensor apparatus and method for use in seismic surveys.

To conduct a geophysical survey of an underwater area in oil exploration or prospecting, it is known to use a multi-component sensor in conjunction with returning echoes produced by a seismic source. Such a sensor comprises an orthogonal array of three geophones. The seismic source is normally impulsive, produced by explosives or airguns; or continuous, produced by vibrator trucks. The source produces sudden pulses of short duration which are reflected and detected by the geophones.

In practice, a number of sensors are inserted in a cable arrangement. In Ocean Bottom Cable or in shallow water operations this cable is fed from a seagoing vessel and allowed to settle on the seabed.

Each geophone is an electromechanical device sensitive to vibrations along its axis. The signals from each geophone are amplified, fed into data processing equipment and arranged to produce a seismic reflection record. Measurement and analysis of seismic vibrations in each axis gives information regarding underlying strata composition.

For the seismic data to be of use, it is necessary to know the orientation of the geophones. Thus, the geophones are mounted on gimbals. The gimbals allow the geophones to rotate under gravity to align with the vertical. Once the cable settles, one of the three geophones is aligned in the vertical axis, and the others are aligned in the horizontal plane, one along the line of the sensor and one at right angles to the line of the sensor. That is, the sensor is mechanically gimballed.

Since on reaching the seabed a sensor can settle in any direction, alignment of the horizontal geophones relative to North is calculated from the seismic data at the time of processing the full seismic data set.

The quality of results provided by such a mechanically gimballed sensor is limited by the fact that vibrations act on each geophone via the coupling arm of the gimbals. Hence whilst any vibration does indeed cause a corresponding movement on the respective geophone, this vibration passes to the geophone via the coupling arm of the gimbals.

The effect of this indirect experience of vibrations on the geophones is frequency dependent. The effect ranges from attenuation of the signal at some frequencies, to oscillation of the geophones at the resonant frequency of the coupling arm.

In addition, vibrations in the horizontal axes can produce a swing of the gimbals which translates the movement of the vertical sensor to accelerations in its sensitive axis. The sensor cannot differentiate between actual seismic vibrations, and those caused by this cross-coupling.

This conventional apparatus and technique is costly, which restricts its use. In addition, vibration acting on each geophone via the coupling arm of the gimbals, and cross-coupling through the gimbals, give a high probability of error.

An object of the present invention is to provide a means to simplify this apparatus and method, and thus to reduce the cost and increase the accuracy of the survey by a significant factor.

SUMMARY OF THE INVENTION

According to a first aspect of the present invention there is provided a sensor apparatus for use in seismic surveys comprising a plurality of orientation units disposed in fixed positions relative to one another in an orthogonal array.

Preferably said seismic sensor apparatus comprises three orientation units.

In one embodiment a first orientation unit is disposed in a vertical axis (the 'up' axis) relative to the sensor apparatus. A second orientation unit may be disposed along the axis of the sensor apparatus in the horizontal plane (the 'along' axis). In another embodiment a third orientation unit is disposed across the axis of the sensor apparatus in the horizontal plane (the 'across' axis).

Preferably each orientation unit comprises an accelerometer.

Typically each accelerometer is sensitive only to accelerations applied along the axis of the sensor in which it is disposed.

Preferably each orientation unit comprises means for receiving data representative of seismic movement of the earth's surface.

In one embodiment the means for receiving data comprises the accelerometers.

Alternatively said means for receiving data comprises an analog geophone measuring vibration, coupled to an analog-to-digital converter. In this alternative a geophone is preferably fixed in the same axis as each accelerometer.

Preferably the sensor apparatus further comprises means to communicate seismic signals received to data processing software in a data processing unit remote from the sensor. In one embodiment some level of data processing is comprised in the sensor itself.

In a preferred form of the invention, the means to communicate data to the data processing unit comprises electronic or optical means.

In one embodiment the electronic or optical means is a transmission cable or fibre optic link.

Preferably the sensor apparatus is enclosed in a watertight container adapted to be lowered by cable to contact the seabed, the cable also providing a communication path for data.

From another aspect, the invention provides a method of conducting a seismic survey comprising the steps of:

- positioning at least one sensor apparatus comprising three orthogonally arranged accelerometers in terrain of interest;
- using the accelerometers of the apparatus to detect steady state acceleration;
- using the sensor apparatus to collect seismic data produced by natural seismic events;
- transferring data to a central location for analysis;
- analysing the steady state acceleration data to determine the orientation of the apparatus; and
- analysing the seismic data to measure the seismic vibrations.

In one embodiment the method further comprises the step of using accelerometers to collect seismic data.

Preferably the method further comprises inputting signals received by the accelerometers into data processing software. More preferably the method further comprises using data processing software to filter signals from the accelerometers to separate the steady state acceleration due to gravity and time varying signals due to seismic vibrations.

In another embodiment the method further comprises the step of calculating orientation of the system relative to the vertical. In one embodiment calculation of the orientation is implemented in real time. Alternatively, calculation of the orientation is made during processing of seismic data.

In one embodiment, the method further comprises the steps of transposing the seismic signal from the up axis accelerometer to give the seismic signal in the vertical axis; transposing the seismic signal from the along axis accelerometer to give the seismic signal in the horizontal along axis; and transposing the seismic signal from the across axis accelerometer to give the seismic signal in the horizontal across axis.

Preferably, each signal is referenced to the vertical and horizontal planes with the along line lying in the same vertical plane as the along axis of the sensor.

In one embodiment calculation of the transposition of the signal is implemented in real time. Alternatively, calculation of the transposition of the signal may be made during processing of seismic data.

Alternatively, the method comprises the step of using geophones to collect seismic data. Typically one geophone is fixed in the same axis as each accelerometer.

Preferably in this alternative the method further comprises the step of using each geophone to measure the seismic signal component in its axis. Typically, the method further comprises transposing seismic signals from each geophone to give the seismic signal in its required axis.

Typically, the method further comprises the step of using orthogonally disposed magnetic sensors to determine the orientation of the seismic sensor apparatus relative to North. More preferably, the seismic signals are transposed to a North and vertical reference frame. A more accurate calculation of vertical may be also made using alignment information from the magnetic sensors.

BRIEF DESCRIPTION OF THE DRAWINGS

Other objects and advantages of the invention will become apparent upon reading the following detailed description and upon reference to the drawings in which.

DETAILED DESCRIPTION OF THE INVENTION

Referring to the figures, a seismic survey across a "prospect" or terrain of interest is conducted by positioning a number of sensor units 1 at known locations, typically in a regular array.

Figure 1:
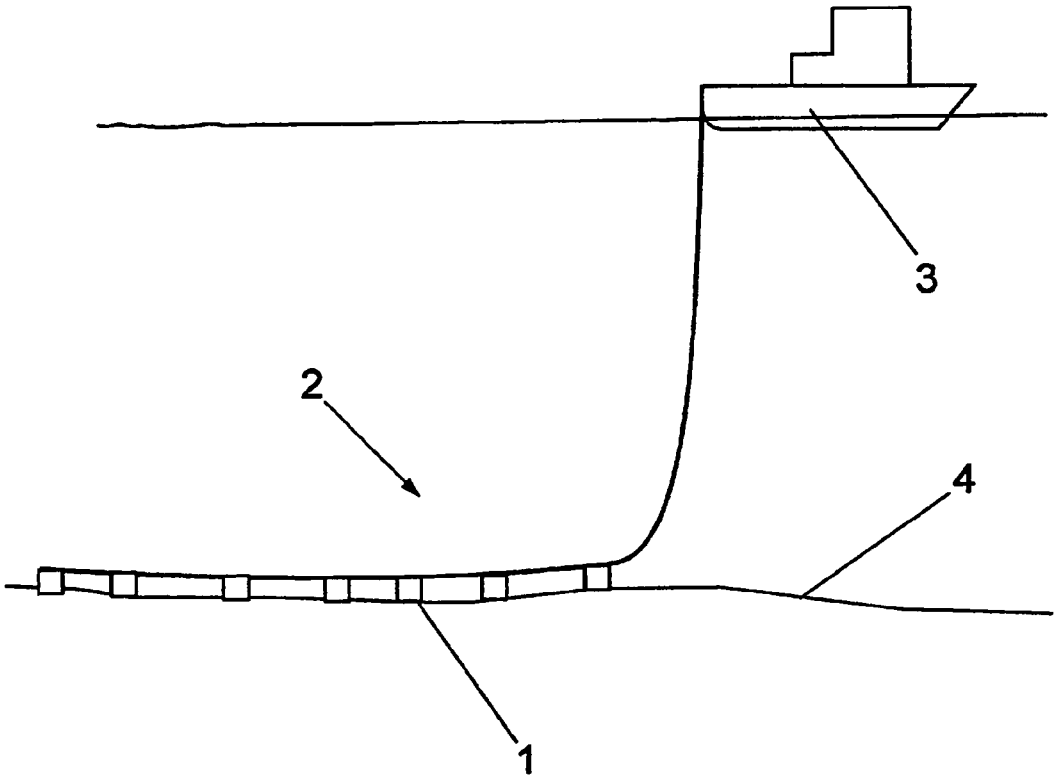
FIG. 1 is a schematic view of a seismic survey arrangement on an Ocean Bottom Cable survey.

One possible application is in ocean bottom cable (OBC) systems and shallow water operations for 3D and 4D seismic acquisition. FIG. 1 shows the sensor units 1 in use in an OBC operation in which sensor units 1 are lowered by cable 2 from a recording vessel 3 to sit on the seabed 4. In such use it is of course necessary to enclose the sensor units 1 in a watertight casing and to use communication means such as electronic or optical transmission via the suspension cable 2 to collect data. The sensor units 1 are also of use in land based operations.

Figure 2A:
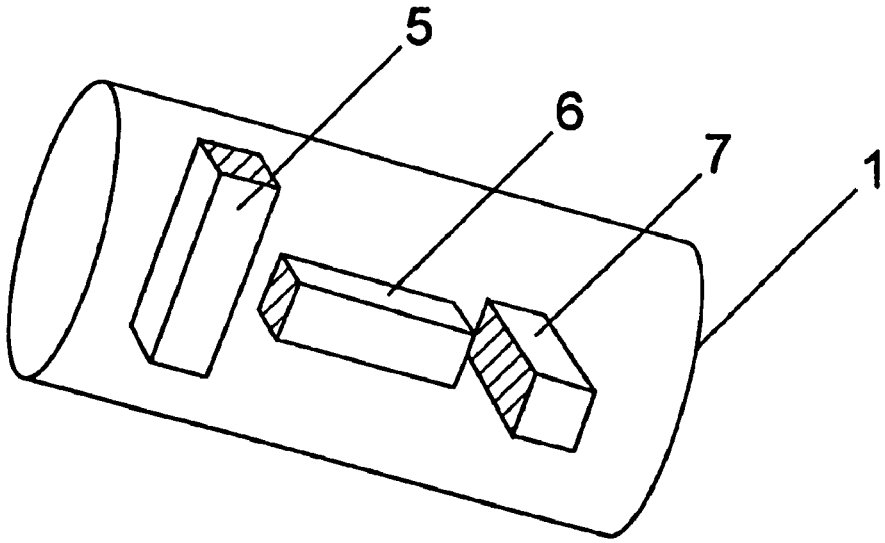
FIG. 2a is a schematic view of a sensor apparatus for seismic surveys including accelerometers, in accordance with an aspect of the present invention, showing the relative orientation of the accelerometers.
Figure 2B:
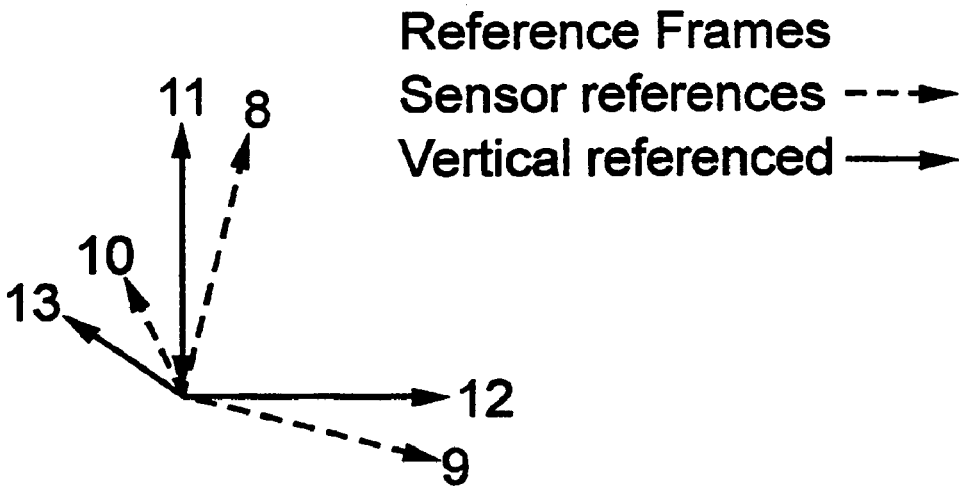
FIG. 2b is a diagram showing the axes of the sensor of the present invention relative to a reference frame.
Figure 2C:
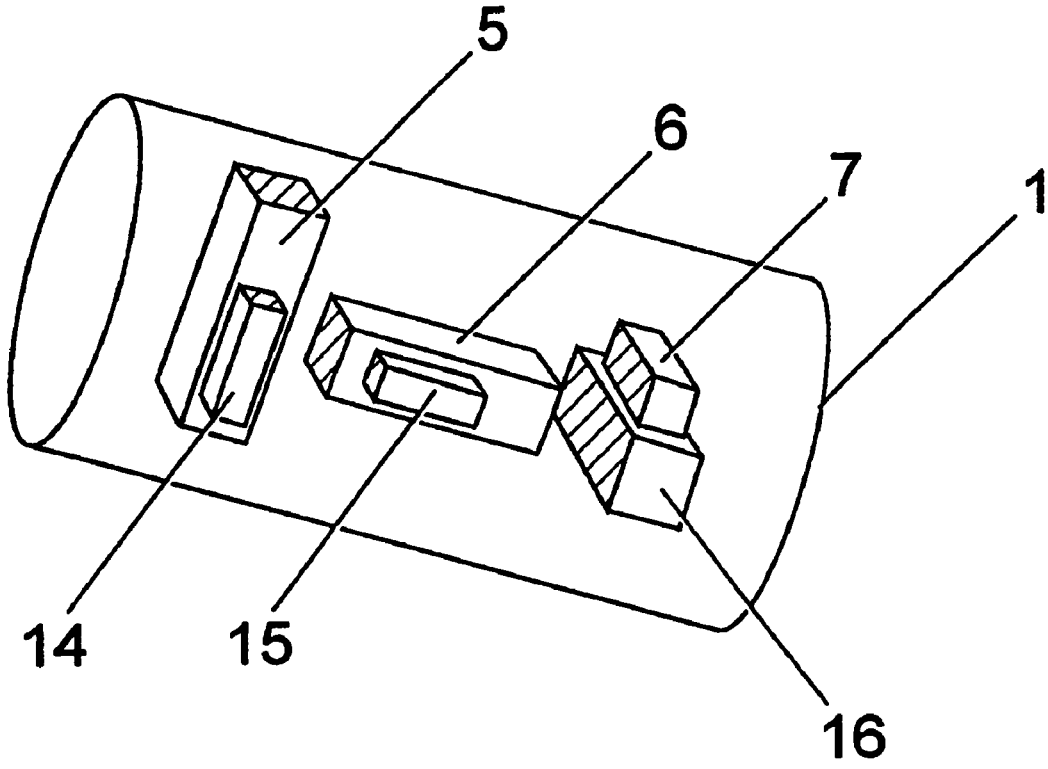
FIG. 2c is a schematic view of an embodiment of a sensor apparatus for seismic surveys according to the present invention, showing a geophone fixed in the same axis as each accelerometer.

FIG. 2a illustrates an individual sensor unit 1 which may be used in the survey of FIG. 1. For simplicity, interconnections and internal electronics of the unit 1 are not shown. This sensor 1 includes three orthogonally disposed accelerometers 5,6,7. As shown in FIG. 2b, the axes in which the accelerometers are disposed are defined relative to the sensor 1 as up 8, along axis 9 and cross axis 10.

Each accelerometer 5,6,7 has a frequency response down to 0 Hz. This frequency response allows each accelerometer 5,6,7 to sense both components of acceleration due to gravity and components of acceleration due to seismic vibration applied along its axis 8,9,10. Each accelerometer 5,6,7 is sensitive only to accelerations applied along its axis 8,9,10.

For any given acceleration the output of each accelerometer 5,6,7 is dependent upon on the angle between its sensitive axis 8,9,10 and the alignment of the acceleration.

The accelerometers 5,6,7 are coupled to a data transmission line and signals received by the accelerometers 5,6,7 are transmitted along the data transmission line and recorded in a suitable unit. Communication between sensors 1 and the data processing unit may be by cable or fibre optic link.

These signals are filtered by data processing software installed in data processing apparatus. Filtering the signals allows separation of the steady state acceleration due to gravity from the time varying signals due to seismic vibrations.

Since acceleration due to gravity is constant and in a known direction, and since the measured steady state accelerations are related to the acceleration of gravity by a basic trigonometric equation, orientation of the system can be calculated relative to the vertical.

Once the orientation of a sensor 1 is so determined, the angle between the vertical 11, and each axis 8,9,10 of the sensor 1 is known. This can be used to form a transformation matrix to transpose the measured seismic signals to the reference vertical 11 and horizontal 12 13 axes as required.

Thus the seismic data measured by each accelerometer 5,6,7 is transposed so that the sensor 1 gives three seismic signals in the required axes, one in the vertical axis 11, and two in the horizontal plane, one along the line of the sensor 1 and one at right angles to it. These are referenced to the vertical and horizontal planes with the along line lying in the same vertical plane as the along axis 9 of the sensor 1.

Calculation of the orientation of the sensor 1 and transposition of the seismic signals can be implemented in real time or at the time of processing the seismic data set. If calculated in real time, the processing is carried out within the sensor 1 by internal electronics (not shown), or in a central processing unit. The processing software may also implement automatic error calculation and cancellation to reduce errors caused by accelerometer misalignment, gain, offset, temperature etc.

In an alternative embodiment, the accelerometers 5,6,7 are used to determine only the orientation of the sensor 1. In this embodiment of the sensor 1, a geophone 14,15,16 is fixed in the same axis as each accelerometer 5,6,7 and measures the component of the seismic signal in the axis 8,9,10 of the accelerometer 5,6,7. The signals received by the geophones 14,15,16 arc transmitted along the same data transmission line as those from the accelerometers 5,6,7 and also recorded in a suitable unit, and processed by suitable software.

Each embodiment of the invention disposes of the need to employ mechanical gimbals. This sensor 1 could be described as an electronically gimballed sensor.

In a modification to the invention it is possible to include three orthogonally disposed magnetic sensors (not shown) in the sensor unit 1. These sensors allow determination of the orientation of the seismic sensor unit 1 relative to North. In addition, data collected by the magnetic sensors can be utilised to complement that provided by the accelerometers 5,6,7 to assist in calculation of orientation relative to the vertical. Thus information provided by the magnetic sensors is used in conjunction with that provided by the accelerometers 5,6,7 to transpose the seismic signals to a North and vertical reference frame.

When deployed, the exact positions of the cable 2 and of each sensor 1 may not be known. These are measured later using acoustic transducers, or alternatively are calculated from information extracted from the seismic signals.

Figure 3:
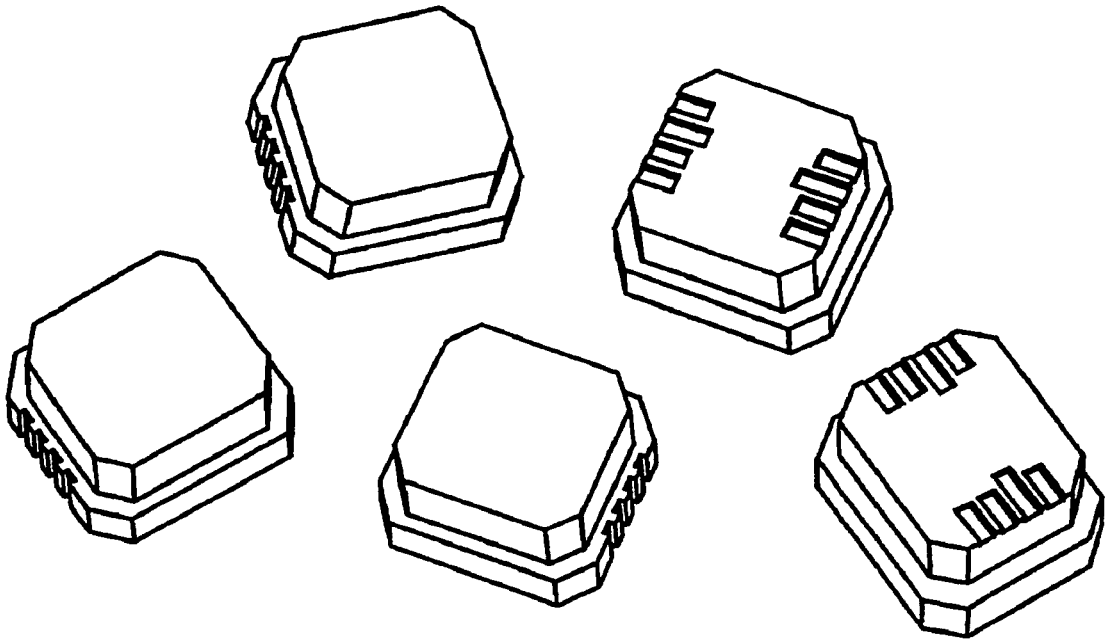
FIG. 3 is a diagram illustrating examples of accelerometers suitable for use in the apparatus of the present invention.

The accelerometers 5,6,7 incorporated in the sensor 1 can be commercially available piezo-electric, piezo-resistive or capacitive accelerometers, examples of which are shown in FIG. 3.

Figure 4:
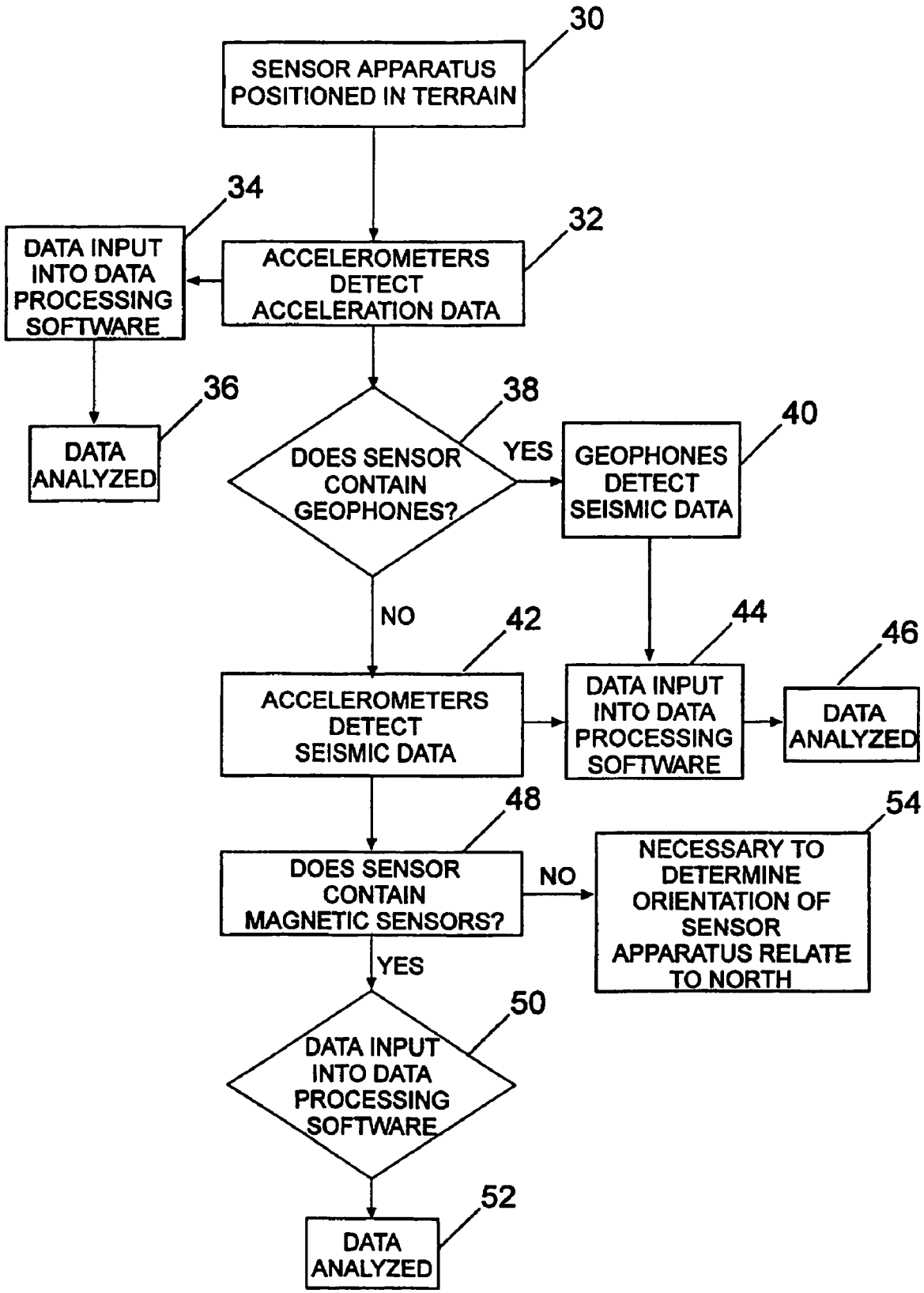
FIG. 4 is a logic diagram showing the steps of the method by which a seismic survey is conducted using a sensor apparatus according to the present invention.

The sensor apparatus of the present invention is used to conduct a seismic survey as illustrated by the flow chart of FIG. 4. Data received by the sensor 1 can be used not only to collect information regarding the composition of the terrain, but also to determine the orientation of the sensor 1.

As shown, a seismic survey is conducted by positioning at least one sensor in terrain of interest 30. The accelerometers of the sensor are used to detect steady state acceleration 32, and this information is used to determine the orientation of the sensor 1 relative to gravity, and thus to the vertical.

The steady state acceleration data is input into data processing software 34 and analyzed to determine the orientation of the sensor 36.

In one embodiment the sensor comprises three orthogonal geophones fixed in the same axis as each accelerometer 38. If the embodiment of the sensor comprises geophones, the geophones are used to collect seismic data from the terrain 40.

In an alternative embodiment, in addition to being used to collect information from which the orientation of the sensor can be determined, the accelerometers of the sensor are used to collect seismic data directly 42.

The seismic data, collected by the accelerometers of the first embodiment or the geophones of the second embodiment, is input into data processing software 44 and analyzed to measure the seismic vibrations in the terrain 46.

Either embodiment of the sensor may incorporate orthogonally disposed magnetic sensors 48. These sensors collect information which is input into data processing software 50 and analyzed to determine the orientation of the seismic sensor apparatus relative to North 52. If the sensor does not include magnetic sensors, alternative means must be used to determine the orientation of the seismic sensor apparatus relative to North 54.

In each embodiment of the sensor, the data received is transferred to a central location for analysis.

These and other modifications and improvements can be incorporated without departing from the scope of the invention.

What is claimed is:

[1. A method of conducting a seismic survey comprising the steps of:

positioning at least one sensor apparatus comprising three orthogonally arranged accelerometers in terrain of interest;

using the accelerometers of the apparatus to detect steady state acceleration;

collecting seismic data produced by seismic events;

transferring data to a central location for analysis;

analysing the steady state acceleration data to determine the orientation of the apparatus; and analysing the seismic data to measure the seismic vibrations.]

[2. A method of conducting a seismic survey according to claim 1 comprising the step of using the accelerometers to collect seismic data.]

[3. A method of conducting a seismic survey according to claim 1 comprising the step of using geophones to collect seismic data.]

[4. A method of conducting a seismic survey according to claim 3 comprising the step of fixing a geophone in the same axis as each accelerometer.]

[5. A method of conducting a seismic survey according to claim 1 comprising the step of inputting signals received to data processing software.]

[6. A method of conducting a seismic survey according to claim 1 comprising the further steps of providing orthogonally disposed magnetic sensors adjacent the accelerometers, and using the output of the magnetic sensors to determine the orientation of the sensor apparatus relative to North.]

[7. A method of conducting a seismic survey according to claim 1 comprising the step of transposing the three signals to the required vertically referenced axes, based on the measured orientation of the apparatus.]

[8. A sensor apparatus for use in seismic surveys, comprising three accelerometers disposed in fixed positions relative to one another in an orthogonal array wherein each accelerometer is sensitive only to accelerations applied along the axis of the sensor apparatus in which the accelerometer is disposed; and wherein each accelerometer is sensitive both to accelerations with frequencies representative of seismic movement of the earth's surface, and to steady state accelerations representative of the effect of gravity.]

[9. A sensor apparatus according to claim S comprising three analog geophones each associated with a respective one of the accelerometers for measuring vibration, the geophones being coupled to an analog-to-digital converter.]

[10. A sensor apparatus according to claim 9 wherein each said geophone is fixed in the same axis as a respective accelerometer.]

[11. A sensor apparatus according to claim 8 comprising means to communicate data such as seismic signals to data processing software in a data processing unit remote from the sensor apparatus.]

[12. A sensor apparatus according to claim 8 further comprising data processing means.]

[13. A sensor apparatus according to claim 11 wherein said means to communicate data is selected from an electric transmission cable and a fibre optic link.]

[14. A seismic survey apparatus for seabed use, the apparatus comprising a cable and at least one watertight container along the length of the cable and adapted to be lowered by said cable to contact the seabed; each container containing a sensor apparatus comprising three accelerometers disposed in fixed positions relative to one another in an orthogonal array wherein each accelerometer is sensitive only to accelerations applied along the axis of the sensor apparatus in which the accelerometer is disposed, and wherein each accelerometer is sensitive both to accelerations with frequencies representative of seismic movement of the earth's surface, and to steady state accelerations representative of the effect of gravity; and means to communicate seismic signals to a data processing unit.]

[15. A seismic survey apparatus according to claim 14 wherein said data processing unit is at a remote location and said cable provides a communication path for data between the watertight container and the remote location.]

*16. A seismic survey apparatus, comprising:*

*a sensor unit including a housing having a housing axis;*

*a first accelerometer disposed in the housing, the first accelerometer measuring acceleration along a first axis;*

*a second accelerometer disposed in the housing, the second accelerometer measuring acceleration along a second axis;*

*a third accelerometer disposed in the housing, the third accelerometer measuring acceleration along a third axis, wherein the first axis, the second axis, and the third axis are substantially orthogonal to each other and form a sensor reference frame relative to the housing axis; and*

*a processor configured to process an output of each of said first accelerometer second accelerometer and third accelerometer to determine a transposition matrix, the transposition matrix being used at least in part to transpose measured seismic vibrations to a second reference frame.*

*17. The apparatus of claim 16, wherein the first accelerometer, the second accelerometer and the third accelerometer measure steady state acceleration.*

*18. The apparatus of claim 16, wherein the processor is disposed within the housing.*

*19. The apparatus of claim 17, wherein an output of the sensor unit is indicative of measured seismic vibrations transposed to the second reference frame.*

*20. The apparatus of claim 16, wherein the first accelerometer, the second accelerometer and the third accelerometer measure steady state acceleration in real time.*

* * * * *